United States Patent [19]

Fellows et al.

[11] Patent Number: 5,232,414
[45] Date of Patent: Aug. 3, 1993

[54] TRANSMISSIONS OF THE TOROIDAL-RACE ROLLING-TRACTION TYPE

[75] Inventors: Thomas G. Fellows, Barnet; Geoffrey B. Soar, Croydon, both of England

[73] Assignee: Torotrak (Development) Limited, England

[21] Appl. No.: 859,444

[22] PCT Filed: Nov. 30, 1990

[86] PCT No.: PCT/GB90/01867
§ 371 Date: May 28, 1992
§ 102(e) Date: May 28, 1992

[87] PCT Pub. No.: WO91/08406
PCT Pub. Date: Jun. 13, 1991

[30] Foreign Application Priority Data

Dec. 1, 1989 [GB] United Kingdom ............. 8927156

[51] Int. Cl.⁵ .............................................. F16H 15/52
[52] U.S. Cl. .................................................. 475/216
[58] Field of Search .............................. 475/216, 219

[56] References Cited

U.S. PATENT DOCUMENTS 3,277,745 10/1966 Harned et al. .................. 475/216 X
4,693,134 9/1987 Kraus ................................ 475/216
4,872,371 10/1989 Fellows ............................. 475/216
5,139,466 8/1992 Perry ............................. 475/216 X

FOREIGN PATENT DOCUMENTS 0149892 7/1985 European Pat. Off. .
957145 5/1964 United Kingdom .
1078791 8/1967 United Kingdom .
2150240 6/1985 United Kingdom .
90/07660 7/1990 World Int. Prop. O. .

Primary Examiner—Dirk Wright
Attorney, Agent, or Firm—Davis, Bujold & Streck

[57] ABSTRACT

A two-regime, continuously-variable-ratio transmission of the toroidal-race rolling-traction type in which the variator (2) reducing epicyclic (10) and mixing epicyclic (15) are all coaxial, in which the driving connection between the variator output and the sun gear (18) of the mixing epicyclic includes a layshaft (23) or the like lying radially outboard of the reducing epicyclic, and avoids the use of a drum-like component which would surround those parts of the variator lying downstream of its output member (8). The invention also facilitates the use of gear units of equal ratio, and indeed of substantially identical structure, for the reversing (10) and mixing (15) epicyclics.

7 Claims, 1 Drawing Sheet

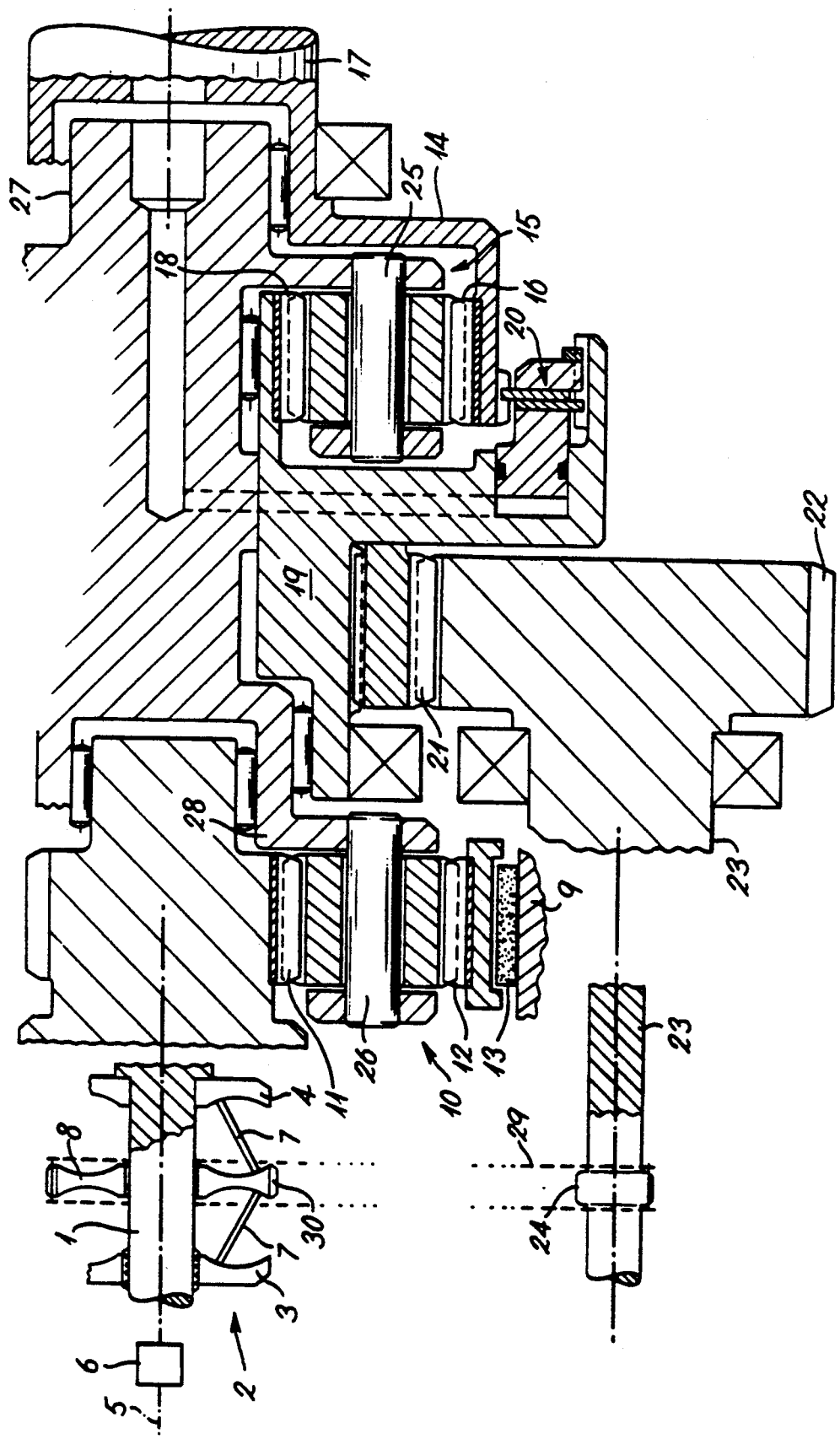

TRANSMISSIONS OF THE TOROIDAL-RACE ROLLING-TRACTION TYPE

This invention relates to transmissions of the toroidal-race rolling-traction type, capable of operating in two different modes or "regimes". Such transmissions, of which examples are shown in patent specification GB-A-1078791, are well known to the man in the art, and comprise in driveline succession a ratio-varying unit or "variator" and one or more gear units of epicyclic or like type. Typically there are two such units, each unit having a component capable of being engaged by a clutch, brake or the like. The output of the second gear unit acts as the output member of the transmission as a whole. With the engaged component of one gear unit held and the other free, traverse of the variator from one end of its ratio range to the other causes the output member to progress continuously from maximum reverse speed, through a condition known as "geared neutral" in which the member is stationary, and then to gather forward speed. During this process the transmission is said to be in "low regime". The components and ratios of the gear units are so chosen that the first engagement may now be released and the second made in its place, without any instantaneous change to the transmitted ratio. The transmission is now said to be in "high regime", and if the variator is now traversed back to the original end of its ratio range, the forward speed of the output member increases continuously.

Sometimes it is desirable to arrange all the major components of such a transmission as nearly as possible coaxial with the operating axis of the variator. Whereas this arrangement is commonplace in toroidal-race transmissions capable of working in a single regime only—as described for example in patent specification GB-A-957145—in a two-regime transmission this has in the past posed two points for particular consideration. Firstly, because the output member of the variator often lies axially-central within that unit, with input members to either side of it, the connection between the variator output and any gear unit downstream of the variator has frequently—as in Patent Specification EP-B-0149892 for example—been in the form of a rotating drum which surrounds and rotates around those parts of the variator that lie downstream of its output member. This can be inconvenient for various reasons, for example if it is wished to ground some of those downstream components of the variator on the housing of the transmission as a whole. Secondly, in many known transmissions of this type it has been found necessary to use different gearing combinations for the two gear units which follow the variator. This naturally adds to complexity and expense by increasing the total number of parts used in the transmission as a whole, and it has frequently—as in patent specifications GB-B-2150240 and EP-B-0149892, for example—required the use of a compound epicyclic gear with double planets for one of the gear units.

The present invention aims to provide a simpler design, potentially with less parts, for a transmission of the concentric type already described.

The invention is defined by the claims and will now be described, by way of example, with reference to the accompanying drawing which is an axial section through the principal components of such a transmission.

The input shaft 1 of a ratio-varying unit ("variator") 2 of the toroidal-race rolling-traction type carries two input discs 3, 4 and is rotated about the operating axis 5 by a prime mover 6. Rollers 7, of variable orientation, transmit drive between input discs 3, 4 and a single but double-faced output disc 8 located midway between the input discs.

A speed-reducing epicyclic gear unit 10 is located axially-downstream of the variator. The sun gear 11 of this unit is mounted on input shaft 1, and the annulus gear 12 can be anchored to the transmission casing 9 by the engagement of a brake 13.

A second and so-called "mixing" epicyclic gear unit 15 is located downstream of unit 10 in the transmission driveline, and the annulus gear 16 of this unit is connected to the output shaft 17 of the transmission by a stepped sleeve 14. The sun gear 18 is mounted on a rotatable sleeve 19 which carries a clutch 20, engageable to anchor sleeve 19 to annulus gear 16. A gear 21 on sleeve 19 also engages with a gear 22 mounted at one end of a layshaft 23, and a chain gear 24 carried at the other end of that shaft engages by way of a chain 29 with a gear 30 formed on the outer rim of variator output disc 8, so that output gear 8 and layshaft 23 have like rotation.

In high regime, brake 13 is disengaged and clutch 20 is engaged. Drive is therefore transmitted from the variator to output shaft 17 by way only of output disc 8, layshaft 23, sleeve 19, clutch 20, and stepped sleeve 14, with all other rotatable components of gear units 10 and 15 either locked or unloaded. In low regime clutch 20 is disengaged and brake 13 engaged. The sun gear 18 of gear unit 15 is therefore driven by variator output disc 8 by way of layshaft 23 and sleeve 19. The planet carrier 25, which is directly connected to the planet carrier 26 of unit 10 by way of an integral shaft 27 and stepped sleeve 28, is driven by variator input shaft 1 with speed reduction because of the engagement of sun 11 with the planets on carrier 26, with annulus 16 locked. As is customary in low regimes in this art, the transmission output shaft 17 by being connected to the third unit (the annulus gear 16) of gear unit 15 sums the motion of the other two components 18, 25 of that unit.

Certain features of this transmission will be particularly apparent. Firstly the absence of any drum-like output member connected to variator output disc 8, which would surround the downstream input disc 4 and make access difficult to components such as the rollers 7 which transmit the drive between discs 4 and 8. Secondly, the identical structure of the components (11, 26, 12; 18, 25, 16) of epicyclic gear units 10 and 15. Thirdly, the general concentricity of the transmission; all the principal rotatable components of the variator and of the two gear units 10 and 15 rotate about operating axis 5. Fourthly, the planet carriers (26, 25) of gear units 10 and 15 each carry single planets only; there is no need, in order to obtain the appropriate directions of rotation of output shaft 17, to use double planets in either unit.

We claim:

1. A continuously-variable-ratio transmission (CVT) capable of operating in two regimes and comprising the arrangement in succession of a ratio-varying unit ("variator") (2) of the toroidal-race rolling-traction type having an operating axis (5) and a rotary output (8) and input (1) both aligned with that axis, a speed reducing gear unit (10) and a mixing epicyclic gear unit (15), in which the output (17) of the mixing epicyclic gear unit and the input (11) and output (26) of the reduction gear unit are all coaxial with the variator operating axis, and in which there is a driving connection (29, 23, 22) between the variator output (8) and a component (18) of the mixing epicyclic gear unit (15), characterised in that the said driving connection includes a rotary member (23) displaced from but parallel to the operating axis (5), and lying radially outboard of the speed reducing gear unit (10) relative to that axis.

2. A CVT according to Claim 1 characterised in that the reduction gear unit is of epicyclic form, with coaxial input and output members.

3. An epicyclic according to claim 2 characterised in that the reduction and mixing epicyclic gear units are of equal ratio.

4. A CVT according to claim 3 characterised in that the reduction and mixing epicyclic gear units are substantially identical in structure.

5. A CVT according to claim 2 characterised in that input from the reduction to the mixing epicyclic gear units is provided by way of a direct connection (27) between the planet carriers (26, 25) of the two units.

6. A CVT according to claim 3 characterised in that the two epicyclic gear units are both of simple epicyclic form.

7. A CVT according to claim 1 characterised in that the rotary member (23) of the driving connection (29, 23, 22) between the variator output (8) and the mixing epicyclic gear unit (15) is a layshaft.

* * * * *